United States Patent [19]

Lowles

[11] 4,273,160

[45] Jun. 16, 1981

[54] HIGH PRESSURE HOSE

[75] Inventor: David C. Lowles, Chagrin Falls, Ohio

[73] Assignee: Parker-Hannifin Corporation, Cleveland, Ohio

[21] Appl. No.: 3,844

[22] Filed: Jan. 16, 1979

Related U.S. Application Data

[63] Continuation of Ser. No. 832,325, Sep. 12, 1977, abandoned, which is a continuation of Ser. No. 747,713, Dec. 6, 1976, abandoned.

[51] Int. Cl.³ .......................................... F16L 138/125
[52] U.S. Cl. .................................... 138/124; 138/125; 138/126; 138/127; 138/130
[58] Field of Search ............... 138/123, 124, 125, 126, 138/127, 133, 137, 138, 130; 152/354, 355, 357 R, 358

[56] References Cited

U.S. PATENT DOCUMENTS

| 790,906 | 5/1905 | Marks | 138/137 X |
|---|---|---|---|
| 1,651,022 | 11/1927 | Fulton | 138/127 X |
| 1,692,255 | 11/1928 | Fulton | 138/127 X |
| 3,011,525 | 12/1961 | Randle et al. | 138/137 X |
| 3,498,355 | 3/1970 | Sperberg | 152/354 |
| 3,589,424 | 6/1971 | Sasaki et al. | 152/354 |
| 3,600,350 | 8/1971 | Kwolek | 152/357 R X |
| 3,812,885 | 5/1974 | Sajben et al. | 138/125 |
| 3,851,692 | 12/1974 | Takemura et al. | 152/357 X |
| 3,851,693 | 12/1974 | Takemura et al. | 152/357 X |
| 3,905,398 | 9/1975 | Johonsen et al. | 138/140 X |

FOREIGN PATENT DOCUMENTS

| 862399 | 3/1941 | France | 138/130 |
|---|---|---|---|
| 366370 | 2/1932 | United Kingdom | 138/127 |
| 918349 | 2/1963 | United Kingdom | 138/125 |

Primary Examiner—James E. Bryant, III
Attorney, Agent, or Firm—James A. Baker; Russell E. Baumann

[57] ABSTRACT

A flexible reinforced hose for conveying fluid under pressure and comprising a polymeric core tube covered by two or more layers of stranded reinforcement. Each layer of reinforcement is of a material having a lower modulus of elasticity than the next radially outward layer of reinforcement so that each layer may more readily expand in diameter than the next outer layer due to elongation of the strands when the hose is subjected to fluid under pressure to thus cause the radial load imposed by the fluid pressure to be distributed more evenly among layers. Each layer may comprise first and second sets of oppositely helically wound strands that may be either interwoven to form a braid or a knit or wherein the second set is wound over the first set.

6 Claims, 3 Drawing Figures

HIGH PRESSURE HOSE

This is a continuation, of application Ser. No. 832,325, filed Sept. 12, 1977, now abandoned, which in turn is a continuation of Ser. No. 747,713 filed Dec. 6, 1976, now abandoned.

BACKGROUND OF THE INVENTION

Flexible hoses having core tubes made of elastomeric or flexible plastic materials require reinforcement by one or more layers of stainless steel wire, nylon, fiberglass or the like when the hoses are to be used for conveying fluids under high pressure. Each layer may comprise first and second sets of oppositely helically wound strands that may be either interwoven to form a braid or knit or wherein the second set is wound over the first set to form what is sometimes referred to as a spiral wrap. In hydraulic service the pressure within the hose may be over 1000 psi. For small diameter hoses, such as 0.250 inch ID, one layer of reinforcement may be sufficient to give the hose a burst strength of more than 10,000 psi, depending upon the particular reinforcement material used and the amount of coverage provided by the reinforcement for the core tube. The strands may be of multiple filament or mono filament form.

More than one reinforcing layer frequently is required to provide the necessary burst strength, particularly for larger hoses, such as 0.500 inch ID and over. When two or more layers of reinforcement are used, it is preferable from the standpoint of ease of manufacture to make the two layers identical with respect to material, denier, percent coverage, angle of lay and method of application to the core tube, that is, whether spirally wrapped, braided or knitted. However, in such cases the layers do not share the load imposed by fluid pressure equally between them. The reason for this is that when fluid pressure is applied to the inside of the core tube, the core tube expands in diameter slightly to apply load to the first layer of reinforcement. This first layer then expands in diameter to apply load to the second layer, but each succeeding layer will not expand as much as the preceding layer.

Expansion of the layers comes about because of elongation of the filaments due to tensile stress therein and may also be due in part to the angle of lay of the filament on the core tube when such angle is substantially the same or greater than the neutral angle. Because the innermost layers expand more in diameter than the next succeeding outer layer the filaments of the inner layers are under greater tensile stress than the next outer layer when the materials and angle of lay are the same and are bearing a proportionately greater share of the load imposed by the fluid under pressure. Therefore such inner layers are under greater tensile loading than the next outer layer. As fluid pressure increases, the innermost layer will reach its break point while the next outermost layer is still loaded so as to be considerably below its break point. Thus, full advantage is not taken of the strength of succeeding layers and a greater amount of reinforcing material must be utilized in the innermost layer to achieve a given burst pressure for the hose than would be the case if all reinforcement layers were equally stressed under full load from the fluid pressure.

Because the actual load carried by the second layer of reinforcement in a hose having two such layers is difficult to calculate, it is common industry practice to rely on no more that a 50% increase in burst strength of a hose when adding a second layer of reinforcement identical to the first, whereas if the load could be shared equally by the two layers the increase in burst pressure would be substantially 100%.

A second problem that arises in connection with reinforced hoses involves hydraulic shock pressures. When a hose is installed in the high pressure portion of a hydraulic system, increases of pressure will cause hydraulic shock unless the increae in pressure is cushioned so that pressure rises will not be relatively rapid. When hoses are reinforced with materials of relatively low modulus of elasticity, which results in low strength, the hose will expand in diameter, and hence in internal volume, more readily when fluid pressure rises than if the reinforcing material has a high modulus of elasticity and hence a high yield strength. If the increase in hose internal volume is too rapid the pressure increase will be relatively slow and may result in delayed response or mushiness of operation of the hydraulic system. On the other hand, if such volume increase is too slow the pressure increase will be relatively rapid and result in shock pressures that may be detrimental to the system.

U.S. Pat. No. 3,905,398 describes hose constructions having more than one layer of reinforcement and wherein the inner layer is of a material having a relatively high modulus of elasticity and a relatively low elongation at break while the material of the second layer has a lower modulus of elasticity and a higher elongation at break than the first layer. In such a hose, the strands or filaments of the first layer expand relatively little under high loading and consequently transfer very little of the load to the second layer. Also, there is relatively little give by the first layer of reinforcement when fluid pressure is applied so that high shock pressures may be transmitted with little dissipation.

SUMMARY OF THE INVENTION

In accordance with this invention, a high strength flexible hose having two or more layers of reinforcement is provided and wherein high loads from fluid pressure are shared substantially equally by the various layers and wherein expansion of the hose under high pressure will not be so rapid as to cause mushiness of the hydraulic system and is yet not so slow as to result in hydraulic shock. This is accomplished by making the layers of reinforcement of different materials with the material of each succeeding layer either having a higher modulus of elasticity than the next preceding layer, or wherein two or more adjacent layers have the same modulus of elasticity but which modulus is lower than that of any succeeding layer.

DESCRIPTION OF PREFERRED EMBODIMENTS

Figure 1:
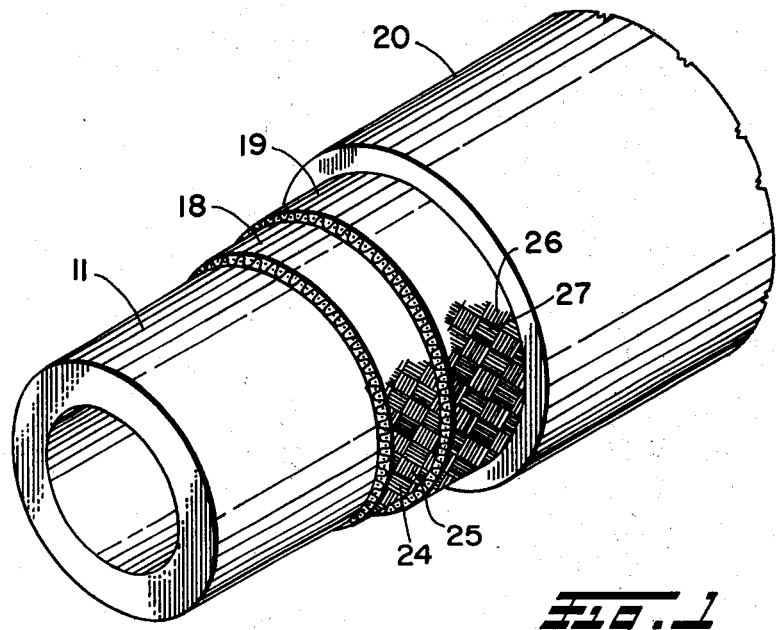
FIG. 1 is a perspective view partly broken away to show successive layers, of a hose having two layers of braided reinforcement.

In the invention as illustrated in FIG. 1, the reinforced hose has a core tube 11 of an elastomeric or flexible plastic material, a first or inner layer 18 of braided strands of reinforcing material, a second or outer layer 19 of braided strands of reinforcing material, and a cover or sheath 20 of elastomeric or flexible plastic material. The elastomeric and flexible plastic materials utilized to form the core tube and the sheath may be selected from any of the well-known materials of these types used in the hose industry for constructing reinforced hoses. Examples of such materials include the chemically extended polyesters and copolyesters of the type described in U.S. Pat. Nos. 3,651,014; 3,766,146 and 3,763,109, as well as polyamides (polyhexamethylene adipamide) and other nylon-type materials, polyesters such as polyethylene terephthalate, polyolefins such as polyethylene and polypropylene, polyvinyl chloride, polyacrylonitrile, polystyrene, polyvinylidene halides such as polyvinylidene chloride, polyurethanes, synthetic rubbers and segmented copolyesters of the type sold by DuPont under the trademark "HYTREL". The selection of the particular material for the core tube 11 and the sheath 20 will depend upon the particular end use of the hose and the desired properties of the core tube and sheath. In FIG. 1 the innermost or first reinforcing layer 18 is of a material that has a lower modulus of elasticity, and a greater elongation at break than the material of the succeeding or outermost layer 19. As a general example, innermost layer 18 may be of polyamide polymers, polyethylene terephthalate ester, cotton, rayon or polyvinyl alcohol fibers, wherein the modulus of elasticity is relatively low and the elongation at break is relatively high.

More specific examples of materials which can be utilized in the first reinforcing layer include a polyethylene terephthalate sold by E. I. DuPont Nemours under the designation Dacron Type 73 and having a modulus of elasticity of 1,120,000 psi (110 grams per denier) a tenacity of about 9.5 grams per denier and an elongation at break of about 12%, and a polyamide sold by DuPont under the designation Nylon Tape 728 and having a modulus of elasticity of about 781,000 psi (55 grams per denier), a tenacity of about 9.8 grams per denier and an elongation at break of about 18.3%.

The second reinforcing layer 19 is of a material such as glass, metal, textile fibers, synthetic fibers, polymeric materials such as aramid, etc., and selected so that it will have a modulus of elasticity that is substantially higher than that of the first layer 18 for any particular hose. An example of a polymeric material suitable for the second reinforcing layer is the fibrous aramid yarn available from E. I. DuPont Company under the trade name "KEVLAR". This material has a modulus of elasticity of about 10,130,000 psi (475 grams per denier at room temperature), a tenacity of 22 grams per denier at room temperature, and an elongation at break of about 4%. The density of the yarn is 1.44.

In the form of the invention shown in FIG. 1, the braided layer 18 comprises a first set 24 of fibrous strands progressing helically in one direction about core tube 11 interwoven with a second set of fibrous strands 25 of the same material as set 24 and progressing helically in an opposite direction about core tube 11 and interwoven with the first set to form such first or innermost braided layer 18. Outermost braided layer 19 is similarly formed with first strand set 26 being the same material as second strand set 27 but with sets 26, 27 being of a material with a higher modulus of elasticity than strand sets 24, 25. A sheath 20 completes the hose.

Figure 2:
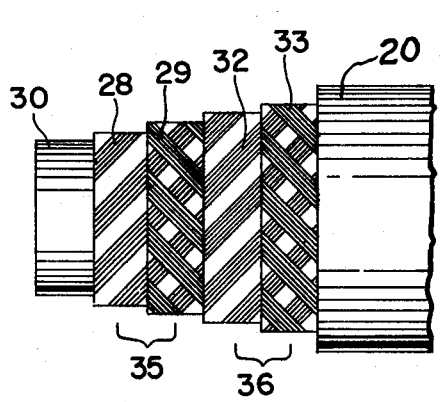
FIG. 2 is a side elevation, partly broken away, of a hose having two layers of spirally wrapped reinforcement.

In the form of invention shown in FIG. 2 there is a first or innermost reinforcing layer 35 known as spiral wrap and formed by a first set of fibrous strands 28 helically wound in one direction over core tube 30 and a second set of fibrous strands 29 helically wound on the first set 28 in an opposite direction. These two sets of strands 28, 29 correspond generally with sets 24, 25 of FIG. 1 but are not interwoven.

In FIG. 2 there is a second or outermost reinforcing spiral wrap layer 36 comprised of a first set of fibrous strands 32 helically wound over first layer 35 in one direction and a second set 33 helically wound over first set 32 in an opposite direction. Strands 32, 33 are of like material but are of a different material than strands 28, 29 in layer 35 and have a higher modulus of elasticity, a higher yield strength and a lower elongation at break than strands 28, 29 in layer 35. Thus such strand sets 32, 33 correspond generally with sets 26, 27 of FIG. 1 but are not interwoven.

As with braided reinforcement, when utilizing spirally wrapped reinforcement it is generally customary to provide two sets of strands for each layer, as the latter term is used herein. The two sets 28 and 29 comprise one layer 35 and sets 32 and 33 comprise another layer 36, so that the one helically wound set of strands will neutralize the other helically wound set of strands in the same layer.

In one specific embodiment of the invention illustrated in FIG. 2 the hose comprises an extruded core tube 30 of polyamide, a first or preceding layer 35 of spirally wrapped strand sets 28, 29 of Dacron Type 737 having an elongation at break of about 14% and a tenacity of about 9.5 grams per denier, and a modulus of elasticity of 1,120,000, a second or succeeding layer 36 of spirally wrapped strand sets of Kevlar having an elongation at break of about 4%, a tenacity of about 22 grams per denier and a modulus of elasticity of about 10,130,000 psi, and a protective thermoplastic polyurethane sheath 20.

In another embodiment of the invetion similar to FIG. 2 the second or succeeding layer 36 of spirally wrapped strand sets 32, 33 may be of carbon steel or stainless steel wire instead of the "KEVLAR" layer of the preceding example.

Figure 3:
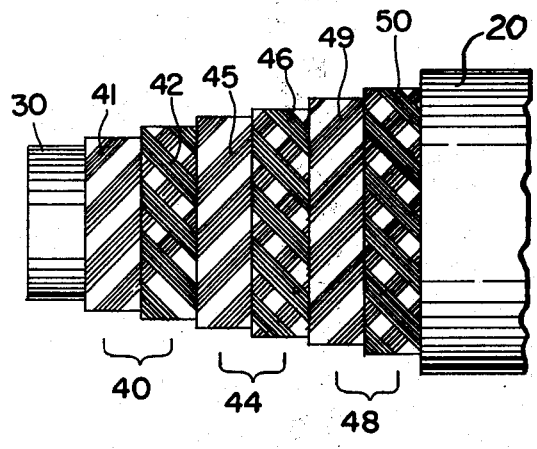
FIG. 3 is a side elevation, partly broken away, of a hose having three layers of spirally wrapped reinforcement.

In FIG. 3 there are three layers of reinforcement strands. The first layer 40 comprises first and second opposite helically wound strand sets 41, 42, the second layer 44 comprises oppositely helically wound strand sets 45, 46, and the third layer 48 comprises oppositely helically wound strand sets 49, 50. The material of the first layer 40 has a lower modulus of elasticity, a lower yield strength and a higher elongation at break than the material of the second layer 44 and the material of the second layer 44 has a lower modulus of elasticity, a lower yield strength and a higher elongation at break than the material of the third layer 48. For example, the first layer 40 may be of Nylon Type 728, the second layer 44 may be of Dacron Type 73 and the third layer 48 may be of Kevlar.

In other modifications, the first and second layers 40 and 44 may be of the same material and layer 48 of a different material with a higher modulus of elasticity than the first and second layers. For example, both layers 40 and 44 may be of either Dacron Type 73 or Nylon Type 728 and third layer 48 of Kevlar. Alternatively, the first layer 40 may be of one material with a relatively low modulus of elasticity such as either Dacron Type 73 or Nylon Type 728 or Nylon Type 728 and both the second and third layers 44 and 48 of one material of relativly high modulus of elasticity, such as Kevlar. In both of these cases the full theoretical benefits of the invention may not be obtained but there will be a gain in that direction.

The reinforcing strands may be applied about the core tube with conventional apparatus. The lay of the strands about the core tube may be varied from an angle of about 40° to about 60° with the axis of the core tube depending upon the desired properties of the hose, but preferably each set of strands that comprise a braid layer in FIG. 1 and each set of strands that comprise a layer in FIGS. 2 and 3 will have the same angle. It is further preferred that all sets of strands on a given hose will have the same angle. Also, the strands in engagement with the core tube will be in tension thereon and each succeeding set of strands will be in tension on the preceding set. Further, the strands of each set may be applied so as to provide 100% coverage of the core tube or preceding layer of reinforcement, or they may be applied to provide less than 100% coverage, as shown in FIGS. 2 and 3.

The strands engaging the core tube may or may not be adhesively bonded thereto and succeeding sets of strands may or may not be bonded to the preceding set. Any suitable adhesive may be used for such bonding, as for example, urethane adhesives, epoxy adhesives, and other elastomeric adhesives.

I claim:

1. A flexible reinforced hose for conveying fluids under pressure comprising a radially expansible core tube of flexible elastomeric material and at least two layers of stranded reinforcement over the core tube, such strands having an angle of lay such that each layer will expand radially upon application of radially outward force thereto, the material of the outermost layer having a modulus of elasticity that is greater than that of the innermost layer, none of such layers having a modulus of elasticity greater than that of any succeeding radially outward layer, and said layers including an intermediate layer of stranded reinforcement having a modulus of elasticity between that of the innermost layer and that of the outermost layer.

2. The hose of claim 1 in which said intermediate layer comprises first and second sets of strands wound in opposite directions about the innermost layer.

3. The hose of claim 2 in which said first and second sets of the intermediate layer are interwoven to form a braid.

4. The hose of claim 2 in which said second set of strands of the intermediate layer is wound over the first set of strands thereof.

5. The hose of claim 2 in which said layers include more than one intermediate layer.

6. The hose of claim 5 in which two or more adjacent layers of reinforcement have substantially the same modulus of elasticity that is less than that of a radially outwardly succeeding layer.

* * * * *